United States Patent
Li et al.

(10) Patent No.: US 9,572,171 B2
(45) Date of Patent: Feb. 14, 2017

(54) SYSTEMS, METHODS, AND DEVICES FOR EFFICIENT DEVICE-TO-DEVICE CHANNEL CONTENTION

(71) Applicant: INTEL IP CORPORATION, Santa Clara, CA (US)

(72) Inventors: Qinghua Li, San Ramon, CA (US); Utsaw Kumar, Santa Clara, CA (US); Huaning Niu, Milpitas, CA (US); Yuan Zhu, Beijing (CN); Pingping Zong, Randolph, NJ (US); Jong-Kae Fwu, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 201 days.

(21) Appl. No.: 14/316,175

(22) Filed: Jun. 26, 2014

(65) Prior Publication Data

US 2015/0117332 A1    Apr. 30, 2015

Related U.S. Application Data

(60) Provisional application No. 61/898,425, filed on Oct. 31, 2013.

(51) Int. Cl.
*H04J 3/00* (2006.01)
*H04W 72/10* (2009.01)
(Continued)

(52) U.S. Cl.
CPC ........... *H04W 72/10* (2013.01); *H04B 17/318* (2015.01); *H04J 3/1694* (2013.01); *H04L 5/0007* (2013.01);
(Continued)

(58) Field of Classification Search
USPC ........ 370/338, 437, 252, 318, 334; 375/267; 455/422.1, 63.1, 67.11
See application file for complete search history.

(56) References Cited

U.S. PATENT DOCUMENTS

| | | | |
|---|---|---|---|
| 2009/0323665 A1* | 12/2009 | Li | H04W 4/20 370/345 |
| 2010/0120372 A1* | 5/2010 | Li | H04L 5/0007 455/68 |

(Continued)

FOREIGN PATENT DOCUMENTS

WO    2013157906 A1    10/2013

OTHER PUBLICATIONS

Wu et al, FlashLinQ: A Synchronous Distributed Scheduler for Peer-to-Peer Ad Hoc Networks, IEEE/ACM Transactions on Networking, vol. 21, No. 4, Aug. 2013, pp. 1215-1228.*

(Continued)

*Primary Examiner* — Phuongchau Ba Nguyen
(74) *Attorney, Agent, or Firm* — Stoel Rives LLP

(57) ABSTRACT

A user equipment (UE) includes a request receipt component, an interference component, and a grant/deny component. The request receipt component is configured to receive a first signal indicating a request to transmit to the UE from a first transmitting UE and to receive one or more additional signals indicating that one or more additional transmitting UEs are requesting to transmit to corresponding target UEs. The interference component identifies, based on a received power of the first signal and the one or more additional signals, one or more potentially incompatible UEs. The incompatible UEs may include at least one of the one or more additional transmitting UEs. The grant/deny component is configured to send a signal indicating a block on transmission by the one or more incompatible UEs.

8 Claims, 10 Drawing Sheets

(51) Int. Cl.
| | |
|---|---|
| H04W 24/10 | (2009.01) |
| H04W 48/06 | (2009.01) |
| H04W 74/00 | (2009.01) |
| H04W 72/04 | (2009.01) |
| H04W 76/02 | (2009.01) |
| H04W 48/08 | (2009.01) |
| H04W 48/18 | (2009.01) |
| H04W 4/00 | (2009.01) |
| H04W 28/02 | (2009.01) |
| H04W 48/12 | (2009.01) |
| H04W 36/00 | (2009.01) |
| H04W 4/02 | (2009.01) |
| H04W 8/00 | (2009.01) |
| H04W 52/34 | (2009.01) |
| H04W 56/00 | (2009.01) |
| H04B 17/318 | (2015.01) |
| H04W 74/08 | (2009.01) |
| H04W 72/08 | (2009.01) |
| H04W 8/06 | (2009.01) |
| H04W 8/18 | (2009.01) |
| H04W 60/00 | (2009.01) |
| H04W 60/02 | (2009.01) |
| H04J 3/16 | (2006.01) |
| H04W 92/20 | (2009.01) |
| H04W 84/12 | (2009.01) |
| H04W 88/08 | (2009.01) |
| H04L 5/00 | (2006.01) |
| H04W 88/02 | (2009.01) |
| H04W 88/16 | (2009.01) |
| H04B 7/04 | (2006.01) |
| H04W 8/04 | (2009.01) |

(52) U.S. Cl.
CPC ............ *H04W 4/003* (2013.01); *H04W 4/008* (2013.01); *H04W 4/02* (2013.01); *H04W 4/023* (2013.01); *H04W 8/005* (2013.01); *H04W 8/06* (2013.01); *H04W 8/183* (2013.01); *H04W 24/10* (2013.01); *H04W 28/0215* (2013.01); *H04W 36/0055* (2013.01); *H04W 48/06* (2013.01); *H04W 48/08* (2013.01); *H04W 48/12* (2013.01); *H04W 48/18* (2013.01); *H04W 52/346* (2013.01); *H04W 56/001* (2013.01); *H04W 56/002* (2013.01); *H04W 60/00* (2013.01); *H04W 60/02* (2013.01); *H04W 72/048* (2013.01); *H04W 72/0453* (2013.01); *H04W 72/0486* (2013.01); *H04W 72/085* (2013.01); *H04W 74/004* (2013.01); *H04W 74/0833* (2013.01); *H04W 76/02* (2013.01); *H04W 76/023* (2013.01); *H04W 76/025* (2013.01); *H04W 76/027* (2013.01); *H04W 76/028* (2013.01); *H04B 7/0413* (2013.01); *H04L 5/001* (2013.01); *H04L 5/0098* (2013.01); *H04W 8/04* (2013.01); *H04W 84/12* (2013.01); *H04W 88/02* (2013.01); *H04W 88/08* (2013.01); *H04W 88/16* (2013.01); *H04W 92/20* (2013.01)

(56) References Cited

U.S. PATENT DOCUMENTS

2010/0205245 A1   8/2010   Le Scouranec et al.
2013/0040677 A1   2/2013   Lee et al.

OTHER PUBLICATIONS

Xinzhou Wu, "FlashLinQ: A Synchronous Distributed Scheduler for Peer-to-Peer Ad Hoc Networks," IEEE/ACM Transactions on Networking, Aug. 2013, pp. 1215-1228, vol. 21, No. 4.
Notification of Transmittal of the International Search Report and the Written Opinion of the International Searching Authority, or the Declaration for PCT US2014/055835, filed Sep. 16, 2014.

\* cited by examiner

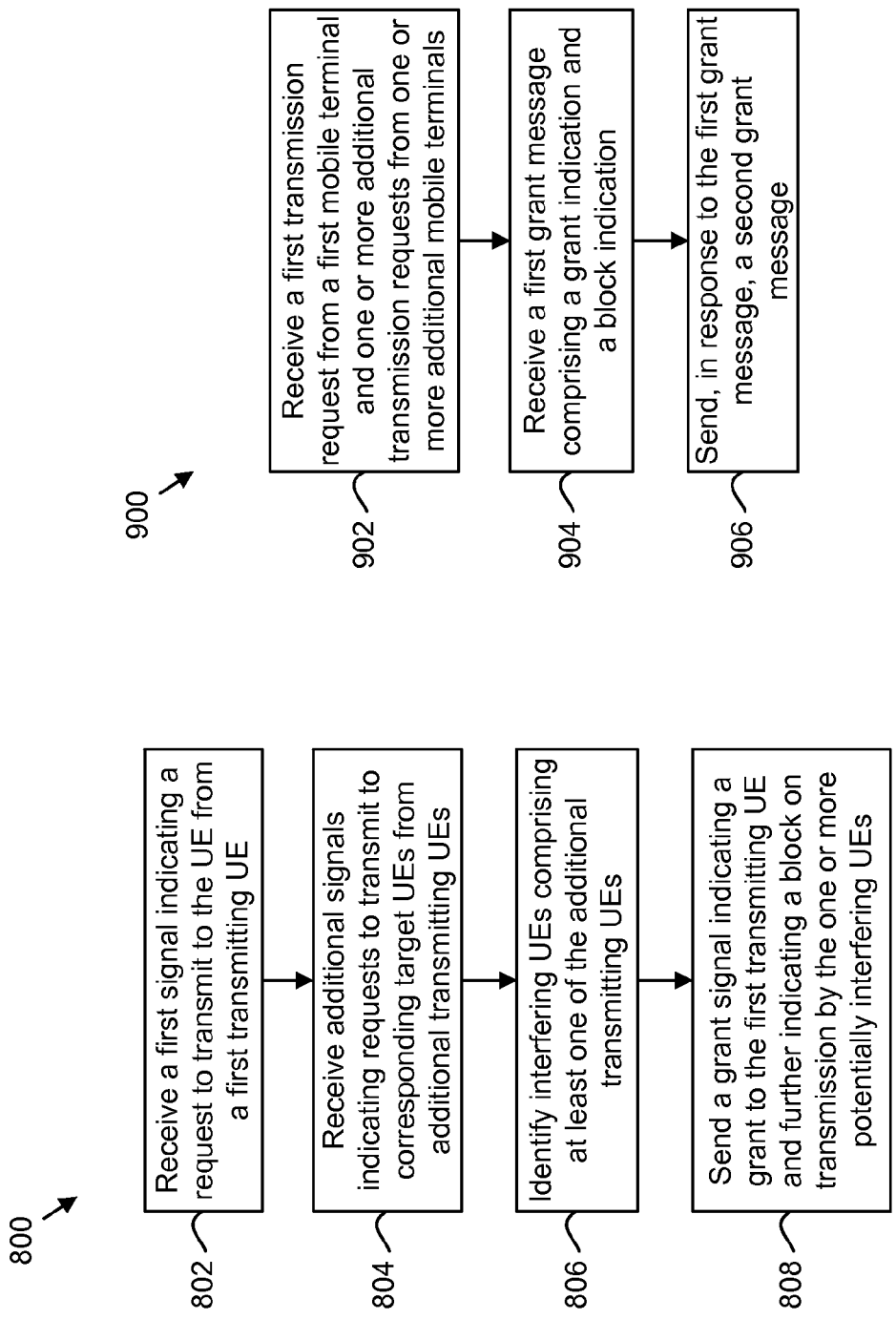

SYSTEMS, METHODS, AND DEVICES FOR EFFICIENT DEVICE-TO-DEVICE CHANNEL CONTENTION

RELATED APPLICATION

This application claims the benefit under 35 U.S.C. §119 (e) of U.S. Provisional Application No. 61/898,425, filed Oct. 31, 2013, which is incorporated by reference herein in its entirety.

TECHNICAL FIELD

The present disclosure relates to device-to-device communication and more particularly relates to channel contention for device-to-device communications.

BRIEF DESCRIPTION OF THE DRAWINGS

FIG. 8 is a schematic flow chart diagram illustrating a method for device-to-device (D2D) channel contention consistent with embodiments disclosed herein.

FIG. 9 is a schematic flow chart diagram illustrating another method for device-to-device (D2D) channel contention consistent with embodiments disclosed herein.

DETAILED DESCRIPTION OF PREFERRED EMBODIMENTS

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In a 3GPP radio access network (RAN) according to LTE, the base station is termed Evolved Universal Terrestrial Radio Access Network (E-UTRAN) Node B (also commonly denoted as evolved Node B, eNodeB, or eNB). It may communicate with a wireless communication device, known as user equipment (UE). Although the present disclosure is presented with terminology and examples generally directed towards 3GPP systems and standards, the teaching disclosed herein may be applied to any type of wireless network or communication standard.

Figure 1:
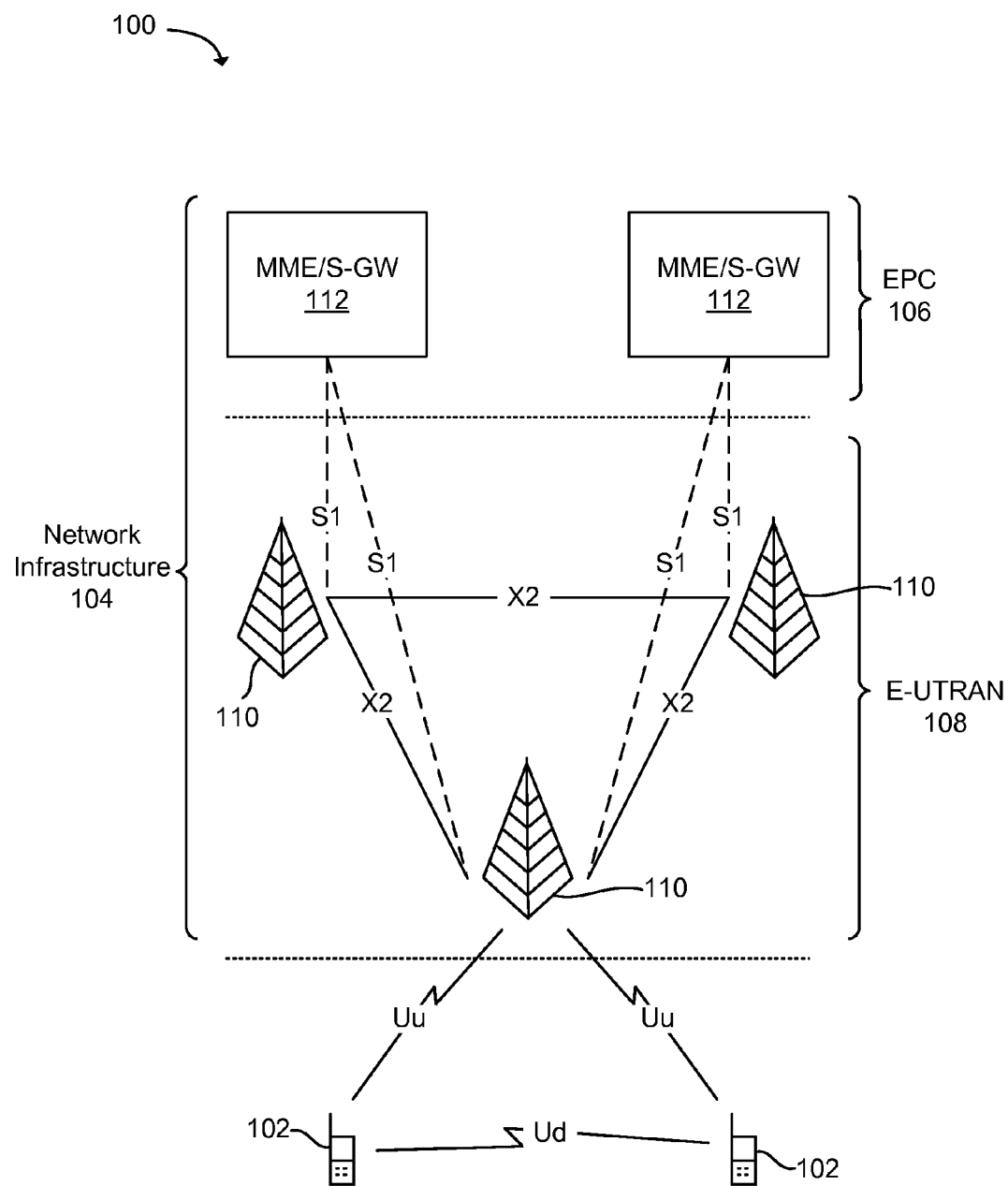
FIG. 1 is a schematic diagram illustrating a wireless communication system and environment consistent with embodiments disclosed herein.

FIG. 1 is a schematic diagram illustrating a communication system 100 that includes a plurality of UEs 102 in communication with network infrastructure 104. The network infrastructure 104 includes an evolved packet core (EPC) 106 and an E-UTRAN 108. The EPC 106 includes mobility management entities (MME) and serving gateways (S-GW) 112 that communicate with eNodeBs 110 in the E-UTRAN 108 over an S1 interface. The S1 interface as defined by 3GPP supports a many-to-many relation between EPC 106 and eNodeBs 110. For example, different operators may simultaneously operate the same eNodeB 110 (this is also known as "network sharing"). The E-UTRAN 108 is a packet switched 3GPP RAN for LTE (i.e., 3.9G) and LTE-Advanced (i.e., 4G) that was first introduced in 3GPP Release 8 and continues to evolve. In the E-UTRAN 108 the eNodeBs 110 are more intelligent than legacy Node Bs of a universal terrestrial radio access network (UTRAN) used in universal mobile telecommunication systems (UMTS or 3G). For example, almost all the radio network controller (RNC) functionality has been moved to the eNodeB rather than being in a separate RNC. In LTE, eNodeBs 110 are connected with each other by means of an X2 interface that allows the eNodeBs 110 to forward or share information.

The UEs 102 are in communication with an eNodeB 110 using a Uu air interface on a licensed cellular spectrum. The UEs 102 and eNodeB 110 may communicate control data and/or user data with each other. A downlink (DL) transmission in an LTE network can be defined as a communication from the eNodeB 110 to the UE 102, and an uplink (UL) transmission can be defined as a communication from the UE 102 to the eNodeB 110.

In addition to DL and UL transmissions over the Uu interface, the UEs 102 are also shown communicating directly with each other over a Ud air interface. Direct communication between devices is commonly known as proximity services (ProSe) or device-to-device (D2D) communication. In D2D, a UE 102 is able to communicate directly with another UE 102 without routing communications via an eNodeB 110 or the core network (e.g., EPC 106), as illustrated by the Ud D2D interface in FIG. 1. D2D is a powerful technique for increasing network throughput by enabling direct communications between mobile stations. Currently, D2D is being considered for public safety. In the future, D2D will apply to more general data communications. For example, D2D has been proposed for local social networks, content sharing, location-based marketing, service advertisements, mobile-to-mobile applications, etc. D2D communications are of interest due to their ability to reduce load on a core network (such as the EPC 106) or a radio access network (such as the E-UTRAN 108), increase data rates due to direct and short communication paths, provide public safety communication paths, and provide other functionality.

There are in principle various alternatives to realize such a direct communication path between mobile devices. In one embodiment, the D2D air interface Ud could be realized by some type of short-range technology, such as Bluetooth or Wi-Fi, or by reusing licensed LTE spectrum, such as a UL spectrum. Furthermore, D2D communications can be generally divided into two parts. The first part is proximity detection (or device discovery) whereby UEs 102 are able to determine that they are within range for D2D communication. Proximity detection may be assisted by network infrastructure 104, may be performed at least partially by the UEs 102, or may be performed largely independent of the network infrastructure 104. The second part is direct communication, or D2D communication, between UEs 102, which includes a process to establish a D2D session between UEs 102 as well as the actual communication of user or application data. D2D communication may or may not be under continuous control of a mobile network operator (MNO). For example, the UEs 102 may not need to have an active connection with an eNodeB 110 in order to take part in D2D communications.

A basic problem in wireless communication is reducing interference or managing contention so that incompatible (i.e., interfering) devices do not transmit at the same time. If a connection with a RAN or core network is maintained, the RAN or core network can control communications to avoid interference. However, when centralized coordination is infeasible, distributed contention is used for channel access. For example, if an earthquake occurs, nearby base stations may not work and D2D devices need to contend for transmissions. With the foregoing in mind, Applicants have recognized that contention overhead is one of the limiting factors for D2D communications and have identified a need for improved efficiency for distributed contention.

In conventional scheduling schemes art, such as in Qualcomm's FlashLinQ, a transmission request needs to be sent multiple times over multiple iterations for scheduling parallel D2D links sharing the same channel with high spatial reuse. Qualcomm's FlashLinQ architecture is disclosed in "FlashLinQ: A Synchronous Distributed Scheduler for Peer-to-Peer Ad-hoc Networks," X. Wu, S. Tavildar, S. Shakkottai, T. Richardson, J. Li, R. Laroia, A. Jovicic, IEEE/ACM Transaction on Networking, August 2013. In FlashLinQ, once the receiver of a D2D link acquires the channel (with the highest priority among all unscheduled links), it broadcasts a grant message to everyone saying it grants the channel to its transmitter. After receiving the grant, the receiver of an unscheduled D2D link (even with the highest priority) cannot grant the channel to its transmitter because the receiver does not know whether its transmitter would cause an unacceptable interference to the scheduled links. The receiver has to wait for its transmitter to check the compatibility and send the transmission request again or give up the contention (i.e., yield).

Applicants have noticed and herein disclose systems and methods where transmission requests may be sent only a single time (instead of multiple times per transmitter) for scheduling the parallel D2D links. In one embodiment, the receiver that just acquired the channel checks the compatibility for the unscheduled transmitters and specifies the incompatible transmitters in the grant message. After receiving the enhanced grant message, unscheduled receivers with the highest priority can send grant messages right away without waiting for additional requests from a corresponding transmitter. In one embodiment, the grant messages that include indications of incompatible transmitters consume the same resources as the original grant message and may lead to reductions in contention overhead by about 30-40%, or greater.

In one embodiment, teachings of the present disclosure may be used as an improvement to the existing FlashLinQ architecture. In one embodiment, teachings of the present disclosure may be used in a unique new contention scheme completely separate from or independent of the FlashLinQ architecture. Although various examples are given in relation to and in comparison with the FlashLinQ architecture, one of skill in the art will recognize the applicability of the present disclosure to other architectures and communication protocols.

In one embodiment, a UE includes a request receipt component, an interference component, and a grant/deny component. The request receipt component is configured to receive a first signal indicating a request to transmit to the UE from a first transmitting UE and to receive one or more additional signals indicating that one or more additional transmitting UEs are requesting to transmit to corresponding target UEs. The interference component identifies, based on a received power of the first signal and the one or more additional signals, one or more incompatible UEs. The incompatible UEs may include at least one of the one or more additional transmitting UEs. The grant/deny component is configured to send a grant signal indicating a grant to the first transmitting UE and further indicating a block on transmission by the one or more incompatible UEs.

Figure 2:
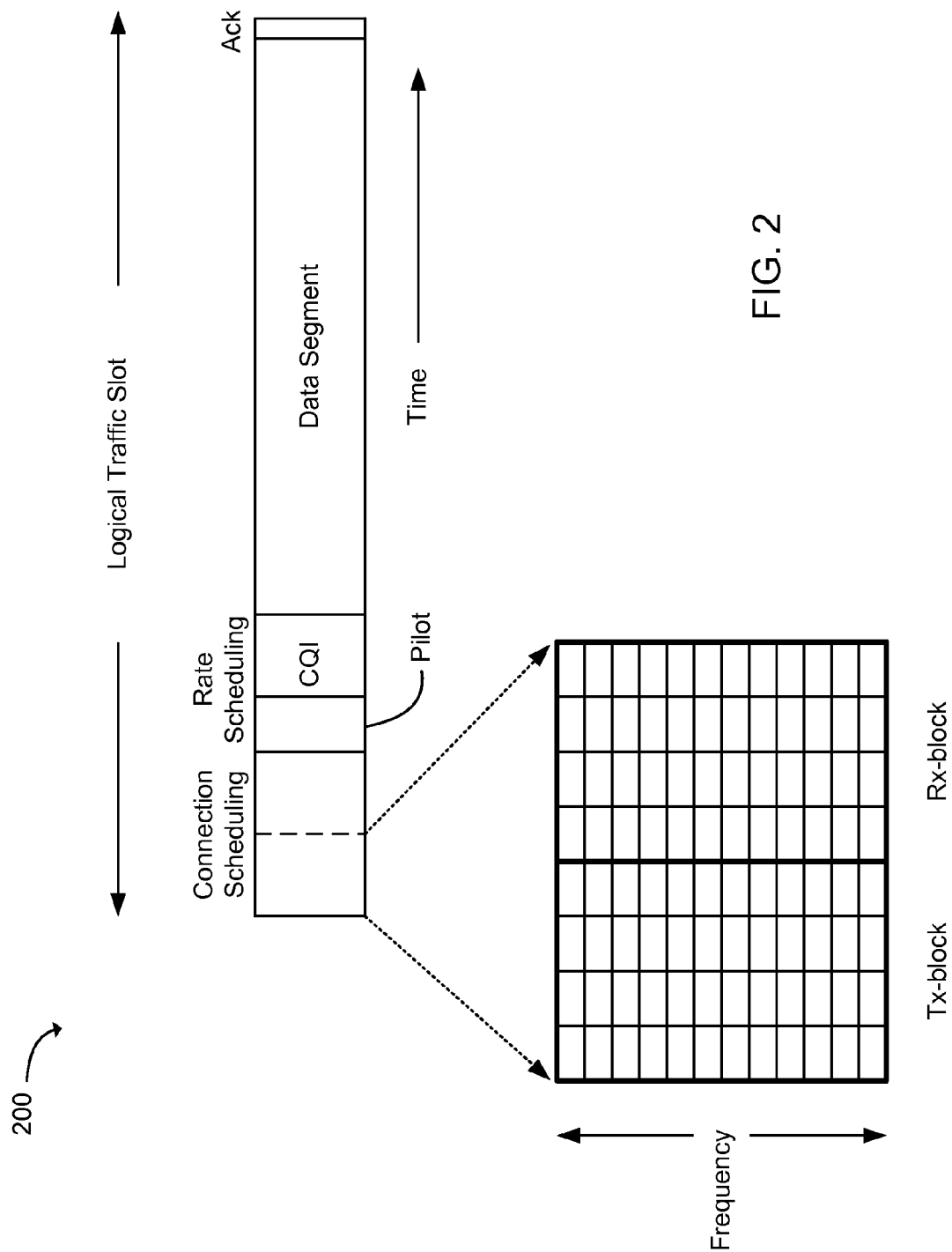
FIG. 2 is a schematic diagram illustrating a logical traffic slot consistent with embodiments disclosed herein.

FIG. 2 illustrates one embodiment of a logical traffic slot 200, as discussed in the FlashLinQ architecture. Please note that the teaching provided herein may be used to modify FlashLinQ architecture or may be used in a completely independent architecture. Discussion of FlashLinQ architecture is provided by way of illustration and background only. In one embodiment, the logical traffic slot 200 includes a smallest segment of resources that may be scheduled by a mobile terminal or UE. In the depicted embodiment, the logical traffic slot 200 may include a plurality of orthogonal frequencies and a length of time. For example, the logical traffic slot 200 may have a length of about 2 milliseconds (ms). The logical traffic slot 200 is divided into various segments, including a connection scheduling segment, a rate scheduling segment, a data segment, and an acknowledgment (Ack) segment. In one embodiment, the connection scheduling segment is used for scheduling transmissions for the data segment and is where channel contention is performed and resolved. The rate scheduling segment may include pilots (Pilot) from scheduled transmitters and channel quality indicators (CQI) from receivers. The data segment may include a block of time and/or resources during and/or within which scheduled transmissions take place. The Ack segment may be used to acknowledge successful reception of data sent during the data segment.

In one embodiment, channel contention occurs during the connection scheduling segment. A simplified explanation of connection scheduling and channel contention will be provided for clarity. The connection scheduling segment is divided into separate blocks, including a transmission request block (Tx-request block) and a bandwidth grant block. Each block is shown divided into a plurality of units called symbols or tones. In one embodiment, each symbol or tone corresponds to a D2D UE or a D2D link between UEs. During the Tx-request block each D2D UE that wishes to transmit sends power on its corresponding tone, which indicates a transmission request for the current logical traffic slot. During the bandwidth grant block, the receiver UE for the highest priority D2D UE or D2D link responds with a grant. The grant may include sending power on a tone corresponding to its requesting D2D UE. In one embodiment, a series of alternating Tx-request blocks and bandwidth grant blocks (e.g., see FIG. 3, discussed below) is performed until all links that can be scheduled are scheduled. Subsequent rate scheduling during the rate scheduling segment, data transmission during the data segment, and acknowledgments during the Ack segment are then performed during the logical traffic slot 200.

The above embodiments are given by way of example only. Further details and example embodiments will be discussed below.

Figure 3:
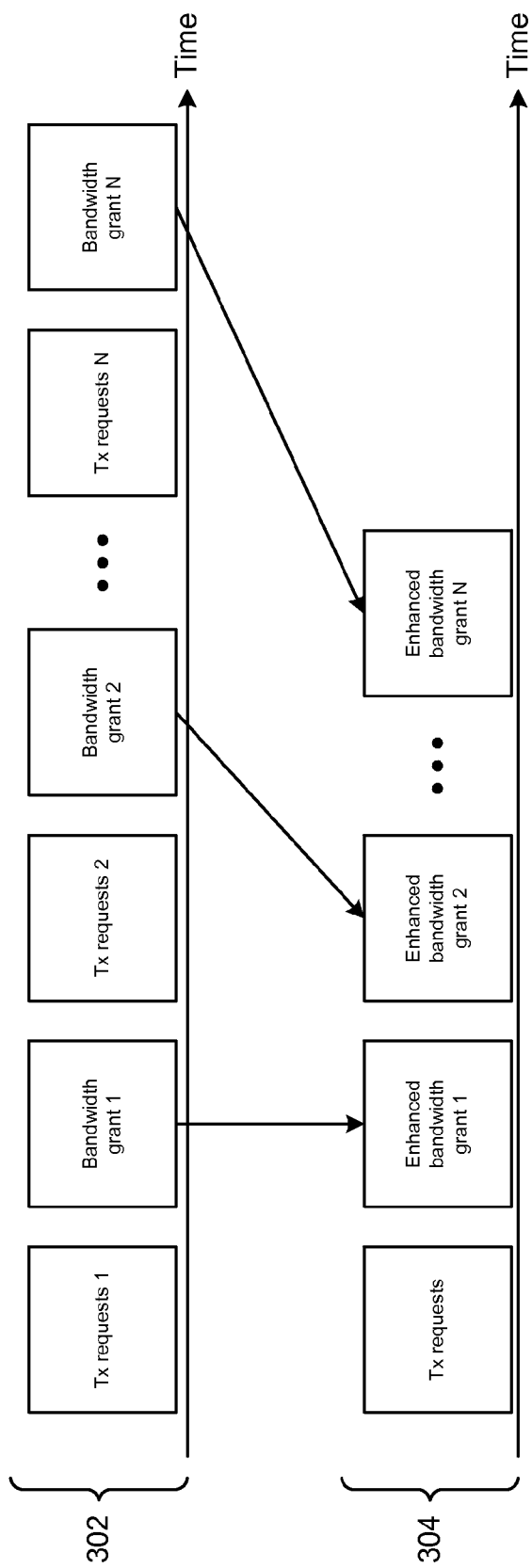
FIG. 3 is a schematic diagram illustrating channel contention consistent with embodiments disclosed herein.

FIG. 3 illustrates methods for channel contention including conventional channel contention 302 (e.g., FlashLinQ) and enhanced channel contention 304. Each scheme is illustrated with a plurality of blocks, each representing either a Tx-request block or an bandwidth grant block. In some situations, different structures for Tx requests and Rx requests may be used. In the conventional channel contention 302, there is at least one Tx request for each bandwidth grant. For example, for N bandwidth grants, it takes at least 2N blocks or segments. In the enhanced channel contention 304, it takes N+1 blocks or segments because only a single Tx request block may be needed. In some situations more than one Tx-request block may be needed to allow for all D2D UEs that desire to transmit to send at least one transmission request. However, the number of Tx-request blocks is still a fixed number and will be N+x wherein N is the number of grants and x is the number of Tx-request blocks to allow each transmitting UE to send one Tx request. Thus, as illustrated, the enhanced channel contention 304 removes the additional transmission requests and can lead to a significant reduction in overhead. In some situations, the contention overhead may be reduced by about 30-40%, or more.

Figure 4:
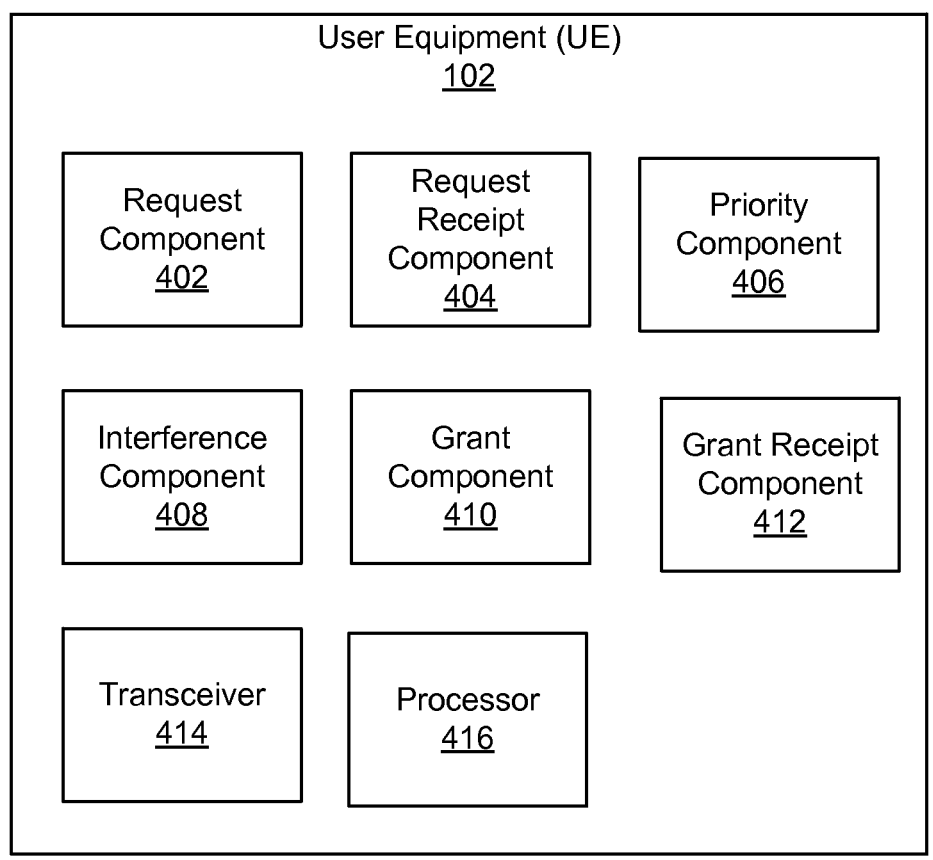
FIG. 4 is a schematic block diagram illustrating one embodiment of a mobile communication device consistent with embodiments disclosed herein.

Turning to FIG. 4, a block diagram of a UE 102 configured to perform efficient channel contention is illustrated. The UE 102 includes a request component 402, a request receipt component 404, a priority component 406, an interference component 408, a grant/deny component 410, a grant receipt component 412, a transceiver 414, and a processor 416. The components 402-416 are shown by way of example and may not all be included in all embodiments. In some embodiments, only one or any combination of two or more of the components 402-416 may be included. In one embodiment, the UE 102 is configured to operate as a transmission UE or a reception UE, as desired for a D2D link or for current communication needs.

The request component 402 is configured to transmit a transmission request to a target UE (or reception UE). In one embodiment, the request component 402 transmits a transmission request in response to determining that the UE 102 has data to transmit over a D2D link to a peer UE. The request component 402 may send the transmission request over a D2D link to the peer UE during a Tx-request block during connection scheduling. In one embodiment, the request component 402 may send the transmission request by sending power on a tone of a tone matrix, such as a tone in the Tx-request block of FIG. 2. In one embodiment, other UEs may send transmission requests during the Tx-request block on different tones. Because the tones can be distinguished, nearby UEs will be able to distinguish which UEs are requesting transmission. In one embodiment, the request component 402 is configured to send a single transmission request for each connection scheduling or logical traffic slot. For example, only a single transmission request may need to be sent to obtain or yield a channel during each traffic slot. In one embodiment, the UE 102 may wait and listen during a plurality of bandwidth grant blocks without transmitting additional transmission requests. In one embodiment, the request component 402 sends the transmission request at an optimal link power, such as a power that will be used for data transmission on the link.

The request receipt component 404 is configured to receive transmission requests transmitted by one or more peer UEs. In one embodiment, the request receipt component 404 receives transmission requests from a peer UE that is part of a D2D session with the UE 102. For example, the request receipt component 404 may receive a signal that indicates a request by the peer UE to transmit data to the UE 102. In one embodiment, the request receipt component 404 may receive transmission requests from unconnected UEs. For example, nearby UEs may request to connect to respective target UEs, and the request receipt component 404 may receive these requests. Although the nearby UEs may be requesting to transmit to a different UE, the UE 102 may use this information for channel contention. For example, the UE 102 may be able to determine whether there are higher priority UEs (or UEs corresponding to higher priority D2D links) that have not yet been scheduled. In one embodiment, the received power or other information included in the transmission requests, such as transmitted power, may be stored for later use.

The priority component 406 is configured to determine a priority for the UE 102 and/or one or more nearby UEs. In one embodiment, the priority component 406 determines the priorities based on a predetermined algorithm so that other nearby UEs can determine the same priorities. For example, the links between UEs may be prioritized such that a high priority link can acquire the channel before the low priority ones. Lower priority links (or UEs that are a part of a low priority link) may wait to schedule a grant message until all higher priority links are scheduled, yield, or are blocked from transmission. In FlashLinQ, if a low priority link predicts that it will cause unacceptable interference to a scheduled high priority link, the low priority link would give up in channel contention, i.e., yield. In one embodiment, the priority for each of the UEs is determined based on a predetermined algorithm and a common seed. For example, all UEs may know the priority for all other UEs within radio proximity. In one embodiment, a UE is configured to determine a priority for its own link (or the priority of a requesting UE) as well as a priority for other UEs that send transmission requests to other corresponding target UEs. In one embodiment, the priority component 406 may determine which tone of a tone matrix (such as a tone of the Tx-request block and bandwidth grant block of FIG. 2) corresponds to which UE. In one embodiment, the priority component 406 may determine the priority of another UE or D2D link based on the tone used for a transmission request.

The interference component 408 is configured to identify one or more incompatible UEs. For example, the interference component 408 may detect a received power for a transmission request from a source UE that is requesting to transmit to the UE 102, as well as for transmission requests that have been sent to other UEs and that belong to other D2D links. The transmission powers or received powers may then be used to estimate a SIR in case the source UE and other transmitting UEs transmit at the same time. In one embodiment, the interference component 408 estimates the SIR based on the transmission requests sent during the Tx-request block of FIG. 2. In one embodiment, the interference component 408 may store an indication of one or more nearby UEs that should be blocked from transmission if UE 102 obtains the channel.

The grant/deny component 410 is configured to send a grant signal indicating that a source UE will be allowed to transmit during the traffic slot. In one embodiment, the grant signal indicates to a requesting UE that it has permission to transmit. The grant signal may include a tone matrix where the grant/deny component 410 sends power on a tone corresponding to the UE that has been granted permission to transmit. For example, the grant signal may include power on a tone of one of the tones of the bandwidth grant block of FIG. 2. The corresponding UE may receive the grant signal and know that it has been granted permission to transmit during the data segment of the traffic slot.

In one embodiment, the grant signal may also include an indication of one or more UEs (or D2D links) that are blocked from transmitting. For example, the grant signal may indicate that one or more UEs that will interfere, as determined by the interference component 408, are blocked from transmitting. This block on transmission limits other UEs from transmitting and causing interference with the granted UE or link. In one embodiment, the grant signal includes a tone matrix where the grant/deny component 410 sends power on a tone corresponding to UEs that have been blocked or banned from transmission. For example, the grant signal may include power on one or more tones of the bandwidth grant block of FIG. 2 to indicate that those UEs have been blocked. Thus, a single bandwidth grant block (or other grant message) may be used to grant a channel to one UE and deny transmission to one or more other UEs. In one embodiment, other UEs can determine which UEs are granted or blocked based on priority. For example, a highest priority tone on which power is sent may be interpreted as a grant, while any lower priority tones may be interpreted as a block or denial for transmission. In one embodiment, instead of having a single tone for each UE, a tone matrix may include double tones (e.g., a grant done and a deny tone) for at least one UE. Grant/block signals and example tone matrices will be further discussed in relation to FIG. 7.

In one embodiment, the grant/deny component 410 is configured to determine whether to grant access to a channel to a requesting UE. The grant/deny component 410 may determine whether to grant the channel based on one or more of a priority, grant messages with grant and/or block indications, and estimated SIR for the channel. In one embodiment, the grant/deny component 410 may determine that the channel should be granted based on a D2D link having the highest priority. For example, if a D2D link or UE has a higher priority than all UEs that sent transmission requests, the grant/deny component 410 may determine that the channel should be granted and send a grant message (which may include one or more block indications denying transmission to one or more other UEs). In one embodiment, if the UE is not the highest priority requesting UE, the grant/deny component 410 also determines whether to grant the channel based on previous grant messages as well as any block indications. For example, if a grant message was previously sent by another reception UE, the grant/deny component 410 may take into account that the corresponding UE has already been granted the channel and will not send any more grant messages. Similarly, the grant/deny component 410 may determine which UEs or links have been disabled or denied in the previous grant message(s). Based on the grant and block indications, the grant/deny component 410 can determine whether its D2D link can still be granted (e.g., has not received a block indication for the channel) and whether there are any other higher priority UEs that have not yet been granted the channel or explicitly denied the channel. If there are no higher priority UEs remaining, and a corresponding D2D link has not been explicitly disabled, the grant/deny component 410 may determine that it should send a grant message.

In one embodiment, the grant/deny component 410 may also estimate a SIR for the channel based on transmission requests and/or one or more grant messages that have been sent. For example, the grant/deny component 410 may determine that a SIR would be too high based on all the other transmitting UEs and may yield the channel. Similarly, the grant/deny component 410 may determine that the SIR is within an acceptable range and send a grant message that includes a grant indication and may also include one or more block indications. In one embodiment, the grant/deny component 410 bases all determinations on whether to grant or deny based on any transmission requests received during one or more initial transmission request blocks so that requesting UEs are not required to send their transmission requests more than one time during connection scheduling for a traffic slot. For example, a first grant message may be sent by a first UE and a second grant message may be sent later by a second UE without any transmission request sent between the first grant message and the second grant message. For example, one or more preliminary Tx-request blocks may be followed by sequential bandwidth grant blocks without any additional Tx-request blocks. In one embodiment, the ratio of grant messages (or bandwidth grant blocks) to transmission requests per device (or Tx-request blocks) is greater than one-to-one (1:1). For example, a single Tx-request block may include a plurality of transmission requests. However, in one embodiment, only one transmission request may be sent per UE because repeat transmission requests may not be needed. In one embodiment, a ratio of bandwidth grant blocks to Tx-request blocks may be at least 3:2, at least 2:1, or greater. In one embodiment, the ratio of bandwidth grant blocks to Tx-request blocks may be 3:1 or greater.

In one embodiment, the grant/deny component 410 may send the grant message (e.g., a tone matrix) at a power different from optimal link power, such as a maximum transmit power or full power to reach as many UE as possible. For example, sending the grant message at a higher power may help ensure that reception UEs corresponding to transmission UEs receive the grant message (and any included block indications). In one embodiment, the grant/deny component 410 may send the grant message at a power different from the transmission requests, such as a power greater than the transmission power for a corresponding transmission request.

In one embodiment, the grant/deny component 410 may send a deny message without any explicit indication of a grant. For example, the grant/deny component 410 may send a deny message that indicates which links or UEs are incompatible with a corresponding parent UE or link. For example, the grant of the channel may be implied such that there is no need to explicitly grant the channel. Because multiple links can be disabled during a grant block while, generally, only one link could be granted during the same grant block, implied grants with explicit denials can lead to more efficient channel contention. In one embodiment, the grant of the channel may be implied to a corresponding link UE and any other nearby UEs by the fact that a UE is transmitting the deny message.

The grant receipt component 412 receives a grant message. The grant message may include a grant indication and one or more block indications, as discussed above. In one embodiment, the grant message may store information regarding the grant message for later usage. For example, the information may be used to determine whether to send a grant message, whether the UE has been denied a request to transmit on the channel, or the like. In one embodiment, the grant receipt component 412 is configured to listen for grant messages during a plurality of sequential bandwidth grant blocks. For example, the grant receipt component 412 may listen for grant messages without the UE 102 transmitting additional transmission requests. In one embodiment, the grant receipt component 412 may receive a grant message that indicates that one or more higher priority UEs have been granted the channel and/or denied the channel. In one embodiment, the grant receipt component 412 determines, based on a grant message, whether a parent UE, corresponding UE, or D2D link has been denied or granted the channel.

The transceiver 414 may include an antenna and circuitry for sending and receiving wireless signals. For example, the transceiver 414 may include a wireless radio that is configured to operate on a licensed or unlicensed spectrum. In one embodiment, the transceiver 414 may be configured to operate based on one or more protocols such as a Bluetooth protocol, 3GPP protocol, Wi-Fi protocol, Wi-Max protocol, or any other protocol. In one embodiment, the transceiver 414 may send and receive signals for other components 402-412 and 416 of the UE 102.

The processor 416 may include any general-purpose or specialized processor. In one embodiment, the processor 416 may process information provided by or stored by one or more of the other components 402-414 of the UE 102. In one embodiment, one or more of the other components 402-414 may include code stored in a computer-readable medium which is executed by the processor 416.

Figure 5:
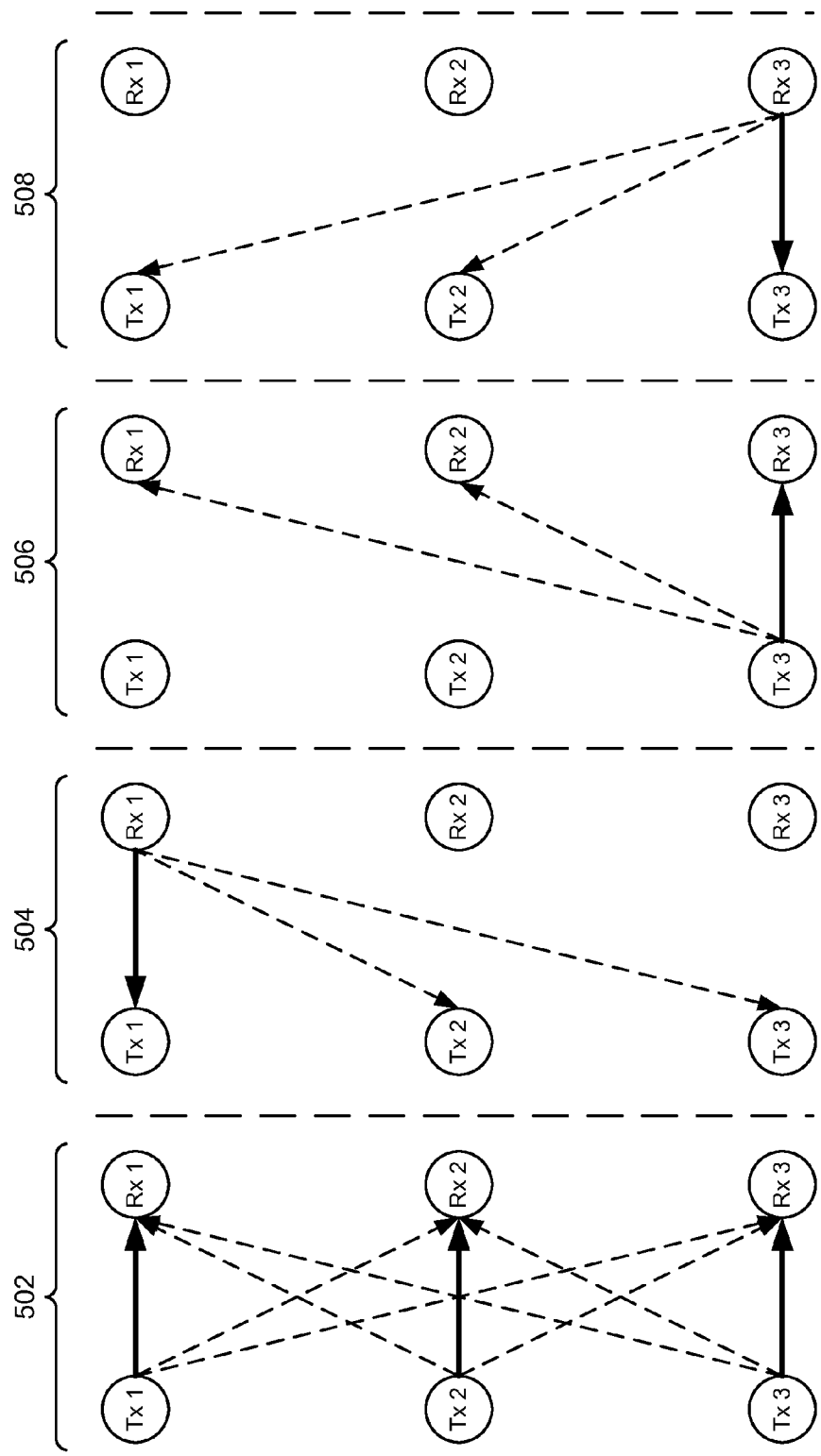
FIG. 5 is a schematic diagram illustrating channel contention.

FIG. 5 is a schematic diagram illustrating conventional contention, e.g., using FlashLinQ architecture and methods. FIG. 5 illustrates communication for a plurality of transmission devices (Tx 1, Tx 2, Tx 3) and reception devices (Rx 1, Rx 2, Rx 3) during a plurality of time periods including a first time period 502, a second time period 504, a third time period 506, and a fourth time period 508. In one embodiment, the first time period 502 and third time period 506 correspond to a Tx-request block where transmission requests are sent. In one embodiment, the second time period 504 and fourth time period 508 correspond to bandwidth grant blocks where grant messages are sent. Solid lines indicate transmissions sent over a D2D link to a peer or connected device, while dotted lines indicate that the transmission may also be received by devices other than a connected or linked device.

In FIG. 5, three links are contending for transmission: link 1, which includes Tx 1 and Rx 1; link 2, which includes Tx 2 and Rx 2; and link 3, which includes Tx 3 and Rx 3. Link 1 and link 3 can run in parallel because they are far apart and the mutual interference is weak (i.e., SIR is sufficiently high). Link 2 cannot run in parallel with link 1 or link 3. The transmission priorities from high to low are link 1, link 2, and link 3, in that order. In other words, link 2 should yield if needed by link 1, and link 3 should yield if needed by link 2. In the first time period 502, the transmitters Tx 1, Tx 2, and Tx 3 send transmission requests indicating that they wish to transmit during the current, or upcoming, traffic slot. The receivers Rx 1, Rx 2, and Rx 3 receive the requests from corresponding transmitters as well as from transmitters corresponding to the other links. Based on the requests, the transmitters will grant bandwidth (or the channel) based on priority. In the second time slot 504, Rx 1, which has the highest priority, grants the channel to Tx 1. Measuring the received power of this grant message, Tx 2 knows it would cause too much interference to Tx 1 if Tx 2 transmitted in parallel with Tx 1. Therefore, Tx 2 gives up (i.e., yields) and does not send a transmission request in the third time period 506. Since Tx 3 does not expect strong interference to Rx 1, based on measuring the received power of Rx 1's grant message, Tx 3 contends again by sending a transmission request in the third time period 506. Finally, Rx 3 grants the channel to Tx 3 in the fourth time period 508.

Figure 6:
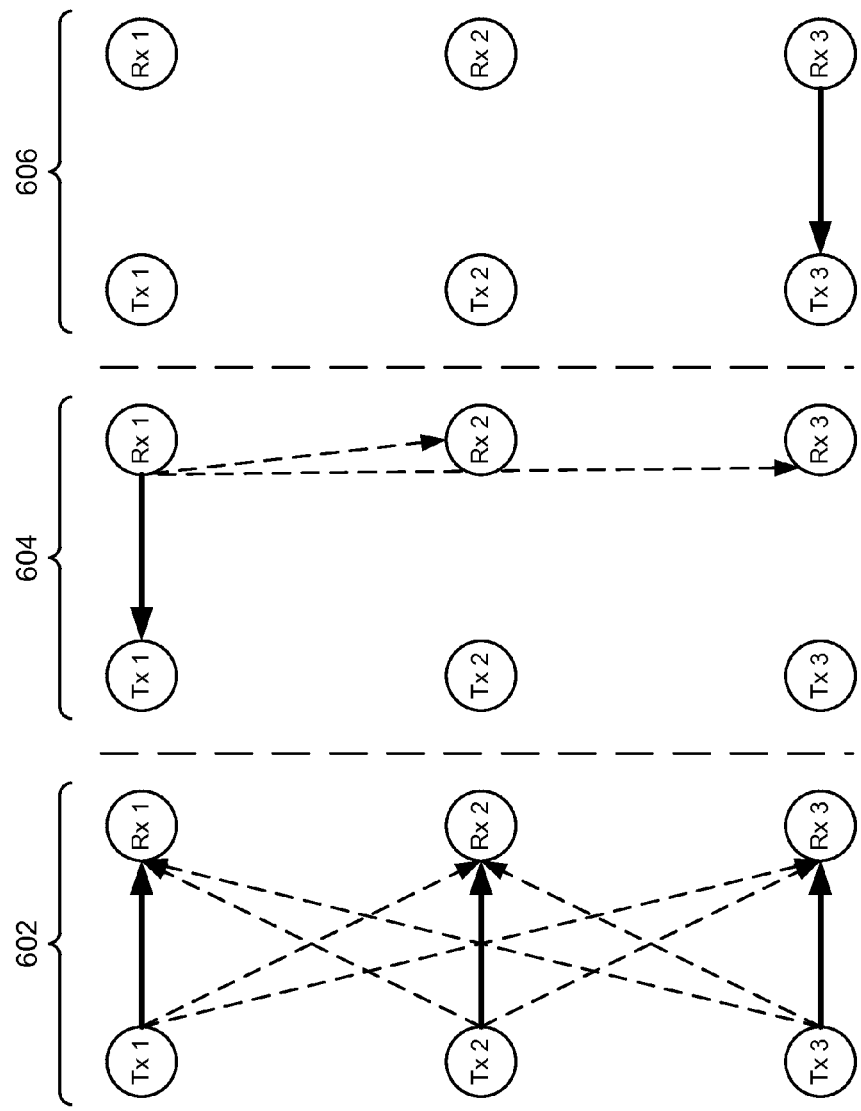
FIG. 6 is a schematic diagram illustrating one embodiment of efficient channel contention consistent with embodiments disclosed herein.

FIG. 6 is a schematic diagram illustrating enhanced contention or more efficient contention, as disclosed herein. A plurality of transmission devices (Tx 1, Tx 2, Tx 3) and reception devices (Rx 1, Rx 2, Rx 3) are shown communicating during a plurality of time periods including a first time period 602, a second time period 604, and a third time period 606. In one embodiment, the first time period 602 corresponds to a Tx-request block where transmission requests are sent. In one embodiment, the second time period 604 and third time period 606 correspond to bandwidth grant blocks where grant messages are sent. Solid lines indicate transmissions sent over a D2D link to a peer or connected device, while dotted lines indicate that the transmission may also be received by devices other than a connected or linked device.

In one embodiment, the new contention scheme is different from the conventional in that transmitters do not need to participate in the contention again and again (i.e., send multiple transmission requests for the same traffic slot). Rather, the receivers may be able to talk to each other directly to decide which links can run simultaneously. As illustrated in FIG. 6, the transmitters Tx 1, Tx 2, and Tx 3 send transmission requests in the first time period 602, similar to the conventional contention scheme. In the second time period 604, Rx 1 (with the highest priority) does more than in the conventional scheme. Specifically, Rx 1 not only grants the channel to its transmitter, Tx 1, but also blocks the transmission of Tx 2. Because Rx 1 can measure the interference from Tx 2 (e.g., during the first time period 602) by checking the received power of Tx 2's transmission request, Rx 1 knows link 1 is incompatible with link 2 Therefore, Rx 1 can block Tx 2 proactively instead of waiting for Tx 2 to check the interference level and yield. Because this determination is done by Rx 1 and transmitted in the grant message, all the links (and receivers) know that Tx 2 has been denied. In the third time period 606, since Rx 3 knows Tx 2 was blocked by Rx 1, Tx 3 has the highest priority among all the unscheduled links. If the interference from Tx 1 is below a threshold, Rx 3 grants the channel to Tx 3 so that link 1 and link 3 can run in parallel. Thus, the new scheme allows the same number of links to be scheduled faster (in fewer time periods) than the conventional scheme. For example, the contention in FIG. 6 is about 25% faster than the contention in FIG. 5. As the number of links increases, the percentage speed increase may continue to improve. This can lead to significant control overhead savings. In some situations, the percentage speed increase may exceed 30%, exceed 40%, and/or approach 50%.

With regard to grant messages, there are multiple ways to implement these enhanced messages or grant/disable messages as disclosed. For example, as discussed above, enhancements or changes to the tone matrix (see FIG. 2) proposed in FlashLinQ may be used to provide the grant and block indications. Specifically, in FlashLinQ, the frequency tones in the grant message are mapped to link identifiers (IDs) uniquely, and the tones are arranged in priority in a logical domain. For each grant message, only the tone corresponding to the granted link has power on it. All the other tones have no power. In contrast, one embodiment of the enhanced scheme carries more information on the same set of tones. Besides sending power on the granted link, the granting receiver also sends power on the tones corresponding to the links that would cause strong interference to the granted link (e.g., the links identified by the interference component 408). The power on the tones of the incompatible links indicates that those links are disabled. Since the granted link has the highest priority among all unscheduled links perceived by the granting receiver, the tones of the disabled links are always below the granted link's tone. Therefore, the first set tone in the tone matrix sorted by priority is interpreted as the granted tone, and the other set tones below in priority are interpreted as the disabled tones.

Figures 7A, 7B:
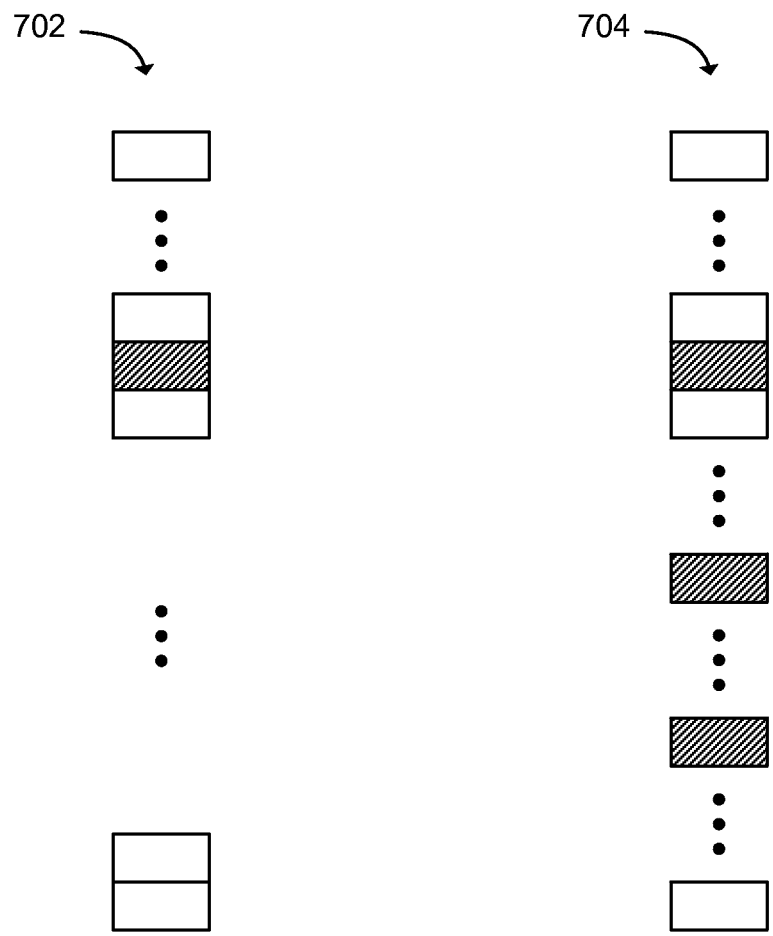
FIGS. 7A and 7B illustrate embodiments of grant messages consistent with embodiments disclosed herein.

FIGS. 7A and 7B illustrate embodiments of grant messages which may be used to grant a channel to a requesting device. FIG. 7A illustrates a tone matrix 702, showing tones in order of priority (top to bottom) with power sent on a single tone (indicated as shaded). No power is sent in other tones (indicated as white). The power on the shaded tone is interpreted as a grant for the corresponding transmitting device or link. FIG. 7B illustrates a tone matrix 704 with power sent on multiple tones (indicated as shaded). The power on the highest priority tone (e.g., the top tone as shown) is interpreted as a grant, while power on subsequent tones (below the top shaded one) are interpreted as blocks or denials for the corresponding transmitting devices or links.

In one embodiment, when the network size is small, e.g., within 200 meters, all the devices can hear each other's transmission requests and grant messages, and the tone matrix above can work without error. In some situations, however, the network size may be larger, and the devices may not be in range with all other devices. For example, each device may hear part of the network and set the tone matrix without full knowledge of the other devices. In this case, multiple devices may set the tone matrix independently. One device may grant a link and another device may disable that link. Thus, there may be a need to differentiate the granting and disabling of the link because sending power on a tone may not be differentiated based on whether it is a grant or a block indication. In some embodiments, additional resources (e.g., additional tones) may be used to indicate that a certain set tone is a granted tone. In one embodiment, this may be resolved by doubling the number of tones for one or more of the devices. For example, some of the higher priority links may have two corresponding tones, one tone for grant and another tone for disable, while lower priority links may have only one or no corresponding tones. In one embodiment, the even numbers of tones may be for granted tones, and the odd numbers of tones may be for disabled tones, or vice versa. Thus, devices may be able to grant and disable links independently on the two separate sets of resources. A waiting device, which overhears superimposed tone matrices sent by different devices, may then be able to determine which links are granted and which links are disabled. In one embodiment, a link is interpreted as disabled if it is disabled by one device no matter how many other devices grant it.

In one embodiment, no explicit bandwidth grants may be transmitted and only blocks on transmission may be transmitted during channel contention. For example, the bandwidth grant blocks may be replaced by link disabling blocks and grant messages may be replaced by block messages which may be used to disable links. In one embodiment, all links that are not explicitly disabled may be implicitly granted the channel. For example, rather than sending an indication granting permission to transmit, only indications of devices or links that are blocked or disabled may be sent. Nearby devices can then determine which devices are allowed to transmit based on whether or not they have been blocked. Similarly, nearby devices can also impliedly determine whether to send a block indication disabling transmission based on the devices priority in relation to other devices that have been blocked. In one embodiment, whether a link is the highest priority remaining link may be determined based on which links have already sent messages blocking other links. In this way, multiple links can be disabled per grant/disable message and the channel contention can be performed in an efficient manner, similar to that illustrated in relation to FIG. 6. In one embodiment, the blocking signal is transmitted at a power to reach the corresponding target UE, the additional transmitting UEs, and/or both. In one embodiment, it may be more beneficial to reach the corresponding target UE (e.g., the UE that is being blocked) rather than the additional transmitting UE.

FIG. 8 is a schematic flow chart diagram illustrating a method 800 for distributed D2D channel contention. In one embodiment, the method 800 is performed by a mobile device, such as the UE 102 of FIG. 4. In one embodiment, the UE 102 may perform the method 800 after joining a D2D session with one or more other UEs.

The method 800 begins and a request receipt component 404 receives 802 a first signal indicating a request to transmit from a first transmitting UE. The request may include a request to transmit to UE 102. The request receipt component 404 also receives 804 one or more additional signals indicating that additional transmitting UEs are requesting to transmit to corresponding target UEs. For example, the additional requests to transmit may include requests to transmit to UEs other than UE 102.

An interference component 408 identifies 806 incompatible UEs comprising at least one of the additional transmitting UEs. For example, the interference component 408 may identify 806 incompatible UEs based on a received power of the first signal and the one or more additional signals. In one embodiment, the interference component 408 may estimate a SIR based on the received power levels (and/or transmission powers) for the first signal and the one or more additional signals, and determine which UEs would cause an unacceptable SIR if they transmitted at the same time as the first transmitting UE.

A grant/deny component 410 sends 808 a signal indicating a block on transmission by the one or more incompatible UEs. In one embodiment, the signal may include a grant message that includes an indication of grant to one UE and a block indication to another UE. In one embodiment, the signal may include a deny message that includes a block indication to the incompatible UEs without any explicit grant indication. In one embodiment, the grant/deny component 410 sends 808 the grant signal in response to a determination to grant permission to the first transmitting UE to transmit.

FIG. 9 is a schematic flow chart diagram illustrating another method 900 for distributed D2D channel contention. In one embodiment, the method 900 is performed by a mobile communication device, such as the UE 102 of FIG. 4. In one embodiment, the UE 102 may perform the method 900 after joining a D2D session with one or more other UEs.

The method 900 begins and a request receipt component 404 receives 902 a first transmission request from a first mobile terminal and one or more additional transmission requests from one or more additional mobile terminals. For example, the request receipt component 404 may receive 902 the requests during a transmission request block (Tx-request block) for connection scheduling for a traffic slot.

A grant receipt component 412 receives 904 a first grant message comprising a grant indication and a block indication. For example, the first grant message may grant a channel to a particular UE while also blocking one or more UEs that might interfere with the channel. In one embodiment, the first grant message includes power sent on one or more tones of a tone matrix. In one embodiment, the first grant message may indicate that one of the additional mobile terminals is granted the channel while transmission of another mobile terminal is disabled. In one embodiment, the grant receipt component 412 receives 904 the first grant message during a first bandwidth grant block.

A grant/deny component 410 sends 906, in response to the first grant message, a second grant message. For example, the grant/deny component 410 may determine that a parent UE is the highest priority UE that has requested transmission and has not yet been granted the channel or blocked from transmitting. In one embodiment, the grant/deny component 410 sends 906 the second grant message in response to this determination. In one embodiment, the grant/deny component 410 sends 906 the second grant message during a second bandwidth grant block after the first bandwidth grant block. In one embodiment, the second grant message may grant the channel to the first mobile terminal. The second grant message may also include an indication disabling a channel of another UE.

Figure 10:
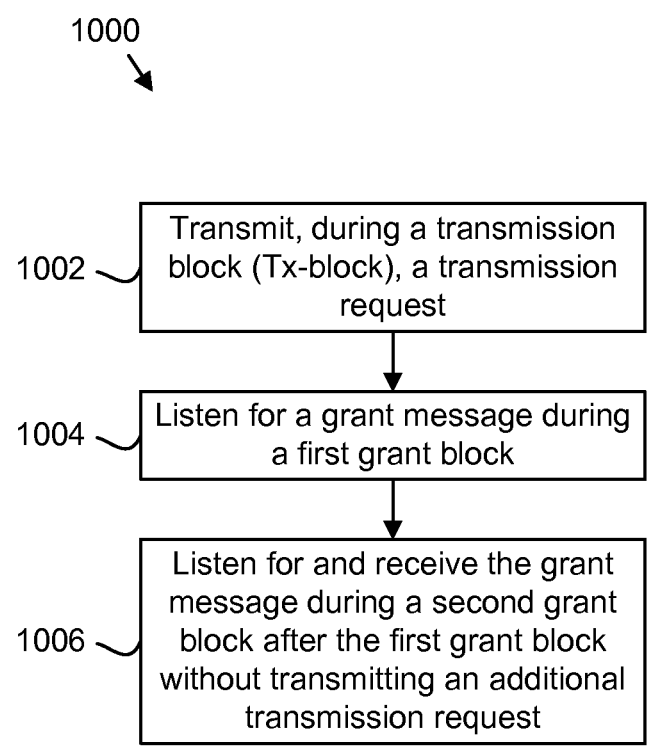
FIG. 10 is a schematic flow chart diagram illustrating yet another method for device-to-device (D2D) channel contention consistent with embodiments disclosed herein.

FIG. 10 is a schematic flow chart diagram illustrating another method 1000 for distributed D2D channel contention. In one embodiment, the method 1000 is performed by a mobile communication device, such as the UE 102 of FIG. 4. In one embodiment, the UE 102 may perform the method 1000 after joining a D2D session with one or more other UEs.

The method 1000 begins and a request component 402 transmits 1002 a transmission request during a Tx-request block. The request component 402 may transmit 1002 the request from a first source user equipment (UE) to a target UE. The request may indicate a request to transmit during a data segment of a current or upcoming traffic slot.

A grant receipt component 412 listens 1004 for a grant message granting the channel to the source UE during a first grant block (i.e., bandwidth grant block). The first grant block may be after the Tx-request block. In one embodiment, the grant reception component 412 listens 1004 for, but does not receive, the grant message. During a second grant block, the grant receipt component 412 listens for and receives 1006 the grant message. In one embodiment, the grant receipt component 412 listens for and receives 1006 the grant message during the second grant block after the first grant block without transmitting an additional transmission request. For example, the UE may only send a single transmission request and listen for a grant message during a plurality of later bandwidth grant blocks, including bandwidth grant blocks that include intervening grant messages.

Figure 11:
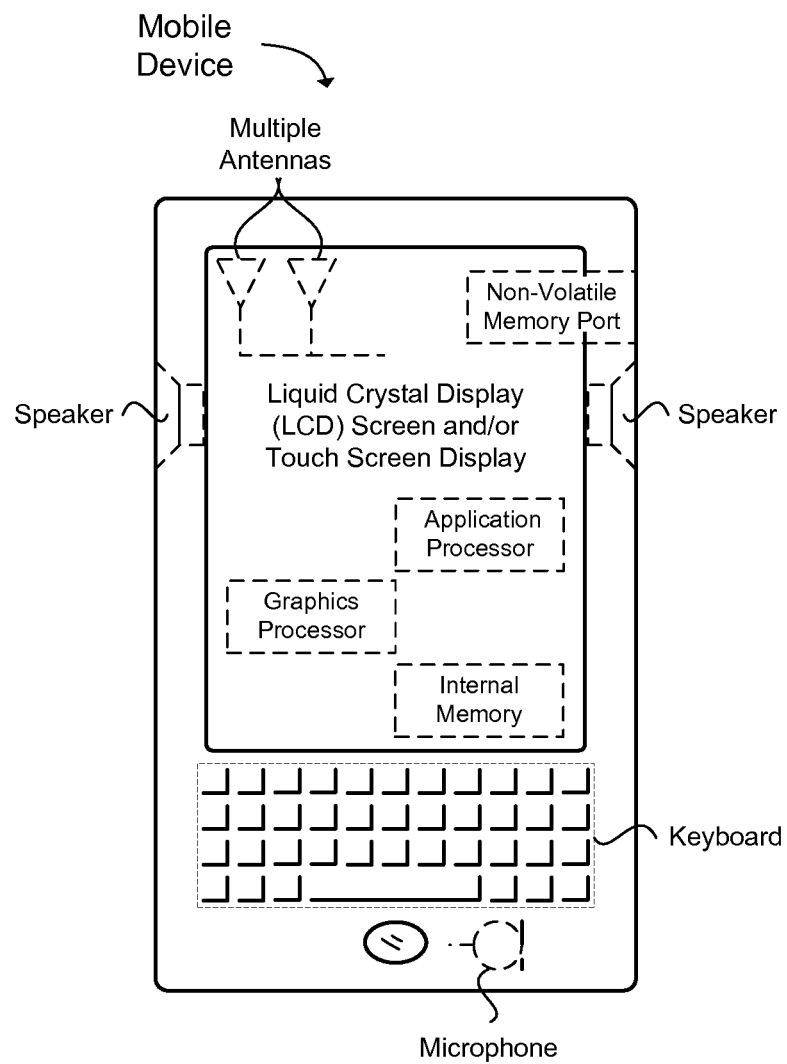
FIG. 11 is a schematic diagram of a mobile device consistent with embodiments disclosed herein.

FIG. 11 is an example illustration of a mobile device, such as a user equipment (UE), a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 11 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is a UE configured to receive a first signal indicating a request to transmit to the UE from a first transmitting UE. The UE is configured to receive one or more additional signals indicating that one or more additional transmitting UEs are requesting to transmit to corresponding target UEs. The UE is configured to identify, based on a received power of the first signal and the one or more additional signals, one or more incompatible UEs, the incompatible UEs comprising at least one of the one or more additional transmitting UEs. The UE is also configured to, in response to a determination to block transmission of the one or more incompatible UEs, send a signal indicating a block on transmission by the one or more incompatible UEs.

In Example 2, the UE of claim 1 is optionally further configured to determine, based on a priority of, the first transmitting UE, the one or more additional transmitting UEs, and the corresponding target UEs, whether to block transmission by the incompatible UEs.

In Example 3, the UE of any of Examples 1-2 is optionally configured to identify the one or more potentially incompatible UEs based on an estimated SIR based on the received first signal and the one or more additional signals.

In Example 4, the signal indicating the block on transmission of any of Examples 1-3 can optionally include a grant signal, wherein sending the grant signal comprises transmitting a tone matrix comprising a plurality of tones corresponding to each of the first transmitting UE and the one or more additional transmitting UEs.

In Example 5, the grant signal of Example 4 can optionally indicate the grant to the first transmitting UE using a tone matrix with power on a first tone corresponding to the first transmitting UE.

In Example 6, the tone matrix of Example 5 can optionally include power on one or more additional tones corresponding to the one or more potentially incompatible UEs. The first tone may include a higher priority than any of the one or more additional tones and the power on priority tones lower than the first tone indicates disabling transmission of a corresponding UE of the one or more additional transmitting UEs.

In Example 7, the tone matrix of Example 5 can optionally include two tones for at least one of the one or more potentially incompatible UEs. The two tones may include a grant tone and a deny tone for a corresponding UE and the grant signal may include power on a deny tone for the at least one of the one or more potentially incompatible UEs.

In Example 8, receiving the first signal of any of Examples 1-7 can optionally include receiving at an optimal link power and sending the grant signal can include sending at a full power.

Example 9 is a mobile terminal that includes a request receipt component, a grant receipt component, and a grant component. The request receipt component is configured to receive, during a transmission request block (Tx-request block), a first transmission request from a first mobile terminal comprising a request to transmit to the mobile terminal, and further to receive one or more additional transmission requests from one or more additional mobile terminals that include requests to transmit to corresponding target mobile terminals. The grant receipt component is configured to receive a first grant message during a first bandwidth grant block. The first grant message includes a grant indication granting permission for a second mobile terminal of the one or more additional mobile terminals to transmit and also includes a block indication disabling a third mobile terminal of the one or more additional mobile terminals from transmitting. The grant component is configured to send, during a second bandwidth grant block and in response to the first grant message, a second grant message comprising a grant indication granting permission for the first mobile terminal to transmit.

In Example 10, each of the first transmission request and the one or more additional transmission requests of Example 9 can optionally include a request to transmit during a traffic slot and each of the grant indications and the block indication grants or disables data transmission during a data segment of the traffic slot.

In Example 11, the mobile terminal of any of Examples 9-10 is optionally further configured to receive the data transmission from the first mobile terminal during the data segment.

In Example 12, the grant component of any of Examples 9-11 is optionally further configured to determine, based on the grant indication and the block indication of the first grant message, whether to grant permission to the first mobile terminal to transmit. The grant component is configured to send the second grant message in response to a determination to grant permission to the first mobile terminal.

In Example 13, the grant component of any of Examples 9-12 is optionally configured to send the second grant message without receiving an additional transmission request from the first mobile terminal between the Tx-request block and transmission of the second grant message.

In Example 14, the mobile terminal of any of Examples 9-13 is configured to receive the first transmission request, receive the one or more additional transmission requests, receive the first grant message, and send the second grant message during connection scheduling for a logical traffic slot.

In Example 15, the connection scheduling of Example 14 optionally includes a ratio of bandwidth grant blocks to Tx-request blocks greater than 1:1.

In Example 16, the connection scheduling of any of Examples 14-15 optionally includes a ratio of bandwidth grant blocks to Tx-request blocks of at least 2:1, at least 3:1, and/or at least 4:1.

Example 17 is a method for distributed scheduling in a peer-to-peer network. The method includes transmitting from a UE, during a Tx-request block, a transmission request to a target UE to request transmission during a traffic slot. The method includes listening, at the first UE, for a grant message from the target UE during a first grant block. The method includes listening for and receiving at the first UE the grant message from the target UE during a second grant block after the first grant block. Listening for and receiving the grant message during the second grant block comprises listening and receiving without transmitting an additional transmission request between transmitting the transmission request and receiving the grant message from the target UE.

In Example 18, transmitting the transmission request, listening for the grant message during the first grant block, and listening for and receiving the grant message during the second grant block of Example 17 optionally includes transmitting and listening during connection scheduling for a single traffic slot without transmitting the additional transmission request during the connection scheduling.

In Example 19, a ratio of a number of transmission requests sent by the first UE to a number of grant messages sent during connection scheduling for a traffic slot in any of Examples 17-18 is greater than 1:1.

In Example 20, a ratio of a number of transmission requests sent by the first UE to a number of grant messages sent during connection scheduling for a traffic slot in any of Examples 17-19 is at least 2:1.

Example 21 is a method that includes receiving, at UE, a first signal indicating a request to transmit to a UE from a first transmitting UE. The method includes receiving one or more additional signals indicating that one or more additional transmitting UEs are requesting to transmit to corresponding target UEs. The method includes identifying, based on a received power of the first signal and the one or more additional signals, one or more incompatible UEs. The incompatible UEs include at least one of the one or more additional transmitting UEs. The method includes, in response to a determination to block transmission of the one or more incompatible UEs, sending a signal indicating a block on transmission by the one or more incompatible UEs.

In Example 22, the method of Example 21 optionally further includes determining, based on a priority of the first transmitting UE, the one or more additional transmitting UEs, and the corresponding target UEs, whether to block transmission by the incompatible UEs.

In Example 23, the identifying the incompatible UEs of any of Examples 21-22 optionally includes identifying the one or more potentially incompatible UEs based on an estimated SIR based on the received first signal and the one or more additional signals.

In Example 24, the signal indicating the block on transmission of any of Examples 21-23 can optionally include a grant signal, wherein sending the grant signal comprises transmitting a tone matrix comprising a plurality of tones corresponding to each of the first transmitting UE and the one or more additional transmitting UEs.

In Example 25, the grant signal of Example 24 can optionally indicate the grant to the first transmitting UE using a tone matrix with power on a first tone corresponding to the first transmitting UE.

In Example 26, the tone matrix of Example 25 can optionally include power on one or more additional tones corresponding to the one or more potentially incompatible UEs. The first tone may include a higher priority than any of the one or more additional tones and the power on priority tones lower than the first tone indicates disabling transmission of a corresponding UE of the one or more additional transmitting UEs.

In Example 27, the tone matrix of Example 25 can optionally include two tones for at least one of the one or more potentially incompatible UEs. The two tones may include a grant tone and a deny tone for a corresponding UE and the grant signal may include power on a deny tone for the at least one of the one or more potentially incompatible UEs.

In Example 28, receiving the first signal of any of Examples 21-27 can optionally include receiving at an optimal link power and sending the grant signal can include sending at a full power.

Example 29 is a method that includes receiving, during a Tx-request block, a first transmission request from a first mobile terminal comprising a request to transmit to the mobile terminal. The method includes receiving one or more additional transmission requests from one or more additional mobile terminals that include requests to transmit to corresponding target mobile terminals. The method includes receiving a first grant message during a first bandwidth grant block. The first grant message includes a grant indication granting permission for a second mobile terminal of the one or more additional mobile terminals to transmit and also includes a block indication disabling a third mobile terminal of the one or more additional mobile terminals from transmitting. The method includes sending, during a second bandwidth grant block and in response to the first grant message, a second grant message comprising a grant indication granting permission for the first mobile terminal to transmit.

In Example 30, each of the first transmission request and the one or more additional transmission requests of Example 29 can optionally include a request to transmit during a traffic slot and each of the grant indications and the block indication grants or disables data transmission during a data segment of the traffic slot.

In Example 31, the method of any of Examples 29-30 optionally further includes receiving the data transmission from the first mobile terminal during the data segment.

In Example 32, the method of any of Examples 29-31 optionally further includes determining, based on the grant indication and the block indication of the first grant message, whether to grant permission to the first mobile terminal to transmit. Sending the second grant message includes sending in response to a determination to grant permission to the first mobile terminal.

In Example 33, the method of any of Examples 29-32 optionally includes sending the second grant message without receiving an additional transmission request from the first mobile terminal between the Tx-request block and transmission of the second grant message.

In Example 34, the method of any of Examples 29-33 includes receiving the first transmission request, receiving the one or more additional transmission requests, receiving the first grant message, and sending the second grant message during connection scheduling for a logical traffic slot.

In Example 35, the connection scheduling of Example 34 optionally includes a ratio of bandwidth grant blocks to Tx-request blocks greater than 1:1.

In Example 36, the connection scheduling of any of Examples 34-35 optionally includes a ratio of bandwidth grant blocks to Tx-request blocks of at least 2:1, at least 3:1, and/or at least 4:1.

Example 37 is an apparatus including means to perform a method as claimed in any of Examples 17-36.

Example 38 is a machine readable storage including machine-readable instructions, when executed, to implement a method or realize an apparatus as disclosed in any of Examples 17-37.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. An apparatus for a user equipment (UE), the apparatus configured to:
   process a first signal received during a single request period of time, the first signal indicating a request to transmit to the UE from a first transmitting UE;
   process one or more additional signals received during the single request period of time, the one or more additional signals indicating that one or more additional transmitting UEs are requesting to transmit to corresponding target UEs;
   identify, based on a received power of the first signal and the one or more additional signals, one or more incompatible UEs by identifying those of the first transmitting UE and the one or more additional transmitting UEs that would interfere with each other during simultaneous device-to-device communications;
   determine to block transmission of at least one of the one or more incompatible UEs by selecting to block at least one of the one or more incompatible UEs that would interfere with at least another of the one or more incompatible UEs;
   in response to the determination to block transmission of the at least one of the one or more incompatible UEs, cause a signal to be sent, the signal indicating a block on transmission by the at least one of the one or more incompatible UEs.

2. The apparatus of claim 1, the apparatus further configured to determine, based at least in part on a priority of the first transmitting UE, the one or more additional transmitting UEs, and the corresponding target UEs, whether to block transmission by the incompatible UEs.

3. The apparatus of claim 1, wherein the UE is configured to identify the one or more potentially incompatible UEs based at least in part on an estimated signal-to-interference ratio (SIR) determined using the received first signal and the one or more additional signals.

4. The apparatus of claim 1, wherein the signal indicating the block on transmission comprises a grant signal, wherein sending the grant signal comprises transmitting a tone matrix comprising a plurality of tones corresponding to each of the first transmitting UE and the one or more additional transmitting UEs.

5. The apparatus of claim 4, wherein the grant signal indicating the grant to the first transmitting UE comprises a tone matrix with power on a first tone corresponding to the first transmitting UE.

6. The apparatus of claim 5, wherein the tone matrix comprises power on one or more additional tones corresponding to the one or more potentially incompatible UEs, wherein the first tone comprises a higher priority than any of the one or more additional tones and wherein the power on priority tones lower than the first tone indicates disabling transmission of a corresponding UE of the one or more additional transmitting UEs.

7. The apparatus of claim 5, wherein the tone matrix comprises two tones for at least one of the one or more potentially incompatible UEs, wherein the two tones comprise a grant tone and a deny tone for a corresponding UE, and wherein the grant signal comprises power on a deny tone for the at least one of the one or more potentially incompatible UEs.

8. The apparatus of claim 1, wherein processing the received first signal and the one or more additional signals comprises processing the received first signal and the one or more additional signals received at an optimal link power and wherein causing the grant signal to be sent comprises causing the grant signal to be sent at a full power.

* * * * *